(12) United States Patent
Zimmermann

(10) Patent No.: US 10,870,218 B2
(45) Date of Patent: Dec. 22, 2020

(54) SPECIALITY CERAMIC COMPONENTS

(71) Applicant: Lakeview Innovation Ltd., Buochs (CH)

(72) Inventor: Dirk Zimmermann, Sexau (DE)

(73) Assignee: LAKEVIEW INNOVATION LTD., Buochs (CH)

( * ) Notice: Subject to any disclaimer, the term of this patent is extended or adjusted under 35 U.S.C. 154(b) by 620 days.

(21) Appl. No.: 15/361,758

(22) Filed: Nov. 28, 2016

(65) Prior Publication Data
US 2017/0151691 A1 Jun. 1, 2017

(30) Foreign Application Priority Data

Nov. 27, 2015 (CH) ........................ 1737/15

(51) Int. Cl.
*B28B 7/34* (2006.01)
*B28B 1/24* (2006.01)
(Continued)

(52) U.S. Cl.
CPC ............. *B28B 7/34* (2013.01); *B24B 7/162* (2013.01); *B24B 7/22* (2013.01); *B28B 1/24* (2013.01); *B28B 1/48* (2013.01); *B28B 7/16* (2013.01); *B28B 11/243* (2013.01); *C04B 35/48* (2013.01); *C04B 35/486* (2013.01); *C04B 35/622* (2013.01); *C04B 35/638* (2013.01); *C04B 35/63488* (2013.01); *C04B 35/6455* (2013.01); *C04B 2235/3217* (2013.01);
(Continued)

(58) Field of Classification Search
CPC ... B29C 64/171; B29C 64/176; B29C 64/182; B29C 64/188; B29C 39/08; B29C 41/04; B29C 41/042; B29C 41/045; B29C 2045/0086; B29C 45/0081
See application file for complete search history.

(56) References Cited

U.S. PATENT DOCUMENTS

| 4,806,295 | A | | 2/1989 | Trickett et al. |
| 5,126,082 | A | * | 6/1992 | Frank .................... C04B 35/622 |
| | | | | 264/28 |

(Continued)

FOREIGN PATENT DOCUMENTS

| CN | 102092083 A | 6/2011 |
| DE | 10 2005 055 524 A1 | 5/2007 |

(Continued)

OTHER PUBLICATIONS

Aremco, Crystalbond 555, https://www.aremco.com/news-item/crystalbond%E2%84%A2-555-temporary-mounting-adhesive-now-available/ , Feb. 24, 2012 (Year: 2012).*

(Continued)

*Primary Examiner* — Timothy Kennedy
(74) *Attorney, Agent, or Firm* — Buchanan Ingersoll & Rooney PC

(57) ABSTRACT

Method for producing ceramic components, more particularly ceramic components having recesses and/or hollow spaces, there being at least one sintered ceramic part present. In order to improve the handling qualities of ceramic components, the sintered ceramic part can include a carrier or carrying section which is removed in the further processing from at least one ceramic component.

15 Claims, 5 Drawing Sheets

(51) Int. Cl.
*B28B 11/24* (2006.01)
*C04B 35/638* (2006.01)
*C04B 35/486* (2006.01)
*C04B 35/634* (2006.01)
*B24B 7/16* (2006.01)
*C04B 35/645* (2006.01)
*B24B 7/22* (2006.01)
*B28B 1/48* (2006.01)
*B28B 7/16* (2006.01)
*C04B 35/48* (2006.01)
*C04B 35/622* (2006.01)

(52) U.S. Cl.
CPC ............. *C04B 2235/3225* (2013.01); *C04B 2235/3246* (2013.01); *C04B 2235/5445* (2013.01); *C04B 2235/6021* (2013.01); *C04B 2235/6022* (2013.01); *C04B 2235/6026* (2013.01); *C04B 2235/61* (2013.01); *C04B 2235/612* (2013.01); *C04B 2235/6567* (2013.01); *C04B 2235/765* (2013.01); *C04B 2235/94* (2013.01); *C04B 2235/945* (2013.01); *C04B 2235/9615* (2013.01); *Y02P 40/60* (2015.11)

(56) References Cited

U.S. PATENT DOCUMENTS

| | | |
|---|---|---|
| 7,476,356 B2 | 1/2009 | McGourlay et al. |
| 2001/0053937 A1 | 12/2001 | Johnson et al. |
| 2006/0223019 A1 | 10/2006 | McGourlay et al. |
| 2007/0264376 A1 | 11/2007 | Souda |
| 2009/0189315 A1 | 7/2009 | Günster et al. |
| 2010/0119767 A1 | 5/2010 | Tanaka |

FOREIGN PATENT DOCUMENTS

| | | |
|---|---|---|
| DE | 10 2009 044 461 A1 | 5/2011 |
| EP | 0 943 592 A1 | 9/1999 |
| EP | 1 710 063 A2 | 10/2006 |
| GB | 948200 A | 1/1964 |
| JP | H03-281158 A | 12/1991 |
| JP | 05162108 A * | 6/1993 |
| WO | 2013/027570 A1 | 2/2013 |
| WO | WO 2014/029483 A1 | 2/2014 |
| WO | WO 2014/202700 A1 | 12/2014 |

OTHER PUBLICATIONS

Aremco, Crystalbond 590, https://www.aremco.com/news-item/crystalbond-590-mounting-adhesive-now-available/, Jan. 22, 2013 (Year: 2013).*

The extended European Search Report dated Jul. 28, 2017, by the European Patent Office in corresponding European Patent Application No. 16200486.5-1703. (12 pages).

* cited by examiner

SPECIALITY CERAMIC COMPONENTS

The present invention relates to a method for producing ceramic components, more particularly ceramic components having recesses and/or cavities, in accordance with the preamble of independent claim 1. The invention further relates to apparatus for carrying out a method of the invention.

TECHNOLOGICAL BACKGROUND

Technical ceramics have become established for numerous applications on account of their advantageous properties as materials. Depending on the ceramic material used, it is possible to obtain properties which would not be possible in such manner and combination with other materials such as metals and polymers. Advantageous properties of various ceramic materials include high mechanical strength and stiffness, high hardness and abrasion resistance, heat resistance, high dielectric constants, and good biocompatibility.

For an exemplary description of the application of technical ceramics for transmission components, the associated advantages and a possible production process, reference is made to: Zimmermann, Dirk; Keramische Bauteile für hochbeanspruchte Kleinantriebe; in: Antriebstechnik, F&M, 105 (1997) 4, Carl Hanser Verlag, Munich, 1997, pp. 217-220; and also to: Zimmermann, Dirk; Keramik in Antrieben; in: at—Aktuelle Technik, 2/2002, B+L Verlags AG, Schlieren, 2002, pp. 26-28.

Ceramic components may have various kinds of recesses or cavities. Recesses may be considered to be any regular or irregular indentation in the surface of a ceramic component. For example, spaces between the teeth of a ceramic cog may be considered as a recess. An axial hole passing through the cog may be considered to be a cavity.

In addition to their mechanical functions, the recesses and cavities may have other functions. They may, for example, help to lower the weight of a ceramic component while leaving stability substantially unaffected, in order to provide lightweight ceramic components. They may serve as ducts or passages for any kind of fluids, radiations, sound, etc.

Methods for producing ceramic components having recesses and/or cavities are known from the prior art. WO14202700A1, for example, describes a method for producing ceramic shielding parts that involves forming chambers by application of different layers in the green state. A first layer is provided and subsequently an intermediate layer is generated on a free side of the first layer. Arms of the interlayer, extending in the longitudinal and transverse directions of the first layer, form chambers or tanks, onto the chambers which are closed by placement of a further layer. Finally, the assembly composed of first layer, intermediate layer and second layer is fired to form the ceramic shielding part. The chambers of the intermediate layer may be charged with a filler in order to improve thermal insulation properties of the shielding part.

WO14029483A1 describes a method for producing green bodies in a plurality of layers, using a pyrolysable binder. The purpose of the layer-by-layer construction is to allow the generation of green bodies having cross sections which change in one direction. The layers may be applied, for example, by a pad printing process. Optionally sinterable particles are added to the binder, and can be removed reactively after sintering. Given sufficient mechanical strength of the green compact, it is possible for particles to be omitted in certain regions, causing these regions to be removed in the pyrolysis.

US4806295A describes a method for producing a ceramic monolithic structure with cavity and passages, where thin layers of ceramic material are laid out and are cut or punched in order to form holes, channels or other shapes. The layers are then layered in a stack, and holes or channels present therein are filled with a support medium, such as a paraffin wax, for example. Thereafter the layered structure is compressed and subsequently, in a preliminary firing step, the support medium is removed completely. Finally, the pressed stack is sintered.

Alternatively, CN102092083A addresses a method for producing a ceramic housing having a cylindrical cavity by moulding of ceramic compositions into a two-part casting mould. The two parts of the mould each have a semi-cylindrical groove, together forming a cylinder which circumscribes the cavity and into which an inflatable tube is inserted.

Furthermore, US2001053937A describes a method for producing bone substitute material with a rigid continuous ceramic supporting structure, where first of all a dispersion is formed in order to generate a slip composed of ceramic powder, zirconium oxide for example, an organic binder and water. The support structure of a net-like, open-pored, organic foam, composed of polyurethane, polyester, polyether or the like, for example, is coated with the slip. This can be done by immersing the foam in the slip and subsequently removing excess slip. Thereafter the remaining slip is dried, the support structure is pyrolysed below a sintering temperature, and finally the remaining ceramic support structure is sintered.

The characteristics of the ceramic support structure described in US2001053937A on exposure to mechanical loads is said to be improved by incorporation into its interstices of an osteoconductive material and also, between this osteoconductive material and the support structure, a bioabsorbable elastic material. The osteoconductive material may be a further ceramic, such as calcium phosphate, for example, which is introduced together with an organic binder into the interstices of the support structure, after first sintering and cooling. After a further sintering step, the binder is pyrolysed and the calcium phosphate forms a further net-like structure which, on account of contraction during sintering, is at a distance from the support structure. The detachment of the calcium phosphate from the support structure can be improved by slightly wetting the latter with paraffin beforehand. The remaining interstice is filled with the bioabsorbable elastic material, which may for example be a polymer such as collagen which is absorbed by a body as soon as its own bone material grows into the interstices during the healing process. Alternatively, the osteoconductive material may not be introduced until during a surgical intervention into the interstices of the support structure coated with the bioabsorbable elastic material.

In the methods known from the prior art, a disadvantage is that they are not in line with modern production requirements. For instance, the duration of the stated methods is too long and/or the production rate cannot be increased as desired. Furthermore, the known methods are unable to keep up with the ongoing requirement for size reduction of components, or else simply meet their limits here. In conjunction with this, or additionally, ceramic parts with recesses and/or cavities which are produced by the known methods often lack stability needed for mechanical further processing.

These disadvantages can in part be lessened or avoided by producing green bodies by injection moulding using polymerizing and/or melted thermoplastic compositions which contain ceramic particles. In this context, however, it is often difficult to fill the cavity in the injection mould without error, if narrow gaps or sharp deflections therein, for example, prevent or hinder the flow of the melt. Especially in the case of multiple cavities, this may constitute a barrier to the filling operation, and, after polymerization and/or solidification, the resulting component acquires voids, stresses or flow lines which may lead to disadvantages or even render the component unusable. Specifically in the context of powder injection moulding, this is a frequently occurring effect, occurring in particular in the case of very small components. With very small components, therefore, the gating should be as large as necessary in order for the cavity to be reliably filled. In turn, however, the gating point may subsequently be disruptive in the later use of a miniature component.

With the powder injection moulding methods known from the prior art, therefore, it continues to be a disadvantage that uniform filling of the cavity without disruptive flow fronts is made difficult. Especially in the case of components with holes, irregular filling may be a problem. In order to provide a remedy here, it is indeed possible to raise the pressure during injection moulding. However, high pressures of 1000 bar, for example, on relatively small openings having diameters of, for example, 0.1 mm on or in the cavities may be problematic, since very high flow velocities occur as a result. The friction resulting from this causes high temperatures, which may damage the melted thermoplastic compositions and/or those to be polymerized, known as the binder system.

SUMMARY OF THE INVENTION

It is an object of the invention to provide advantageous methods for producing ceramic parts. Such production methods are to feature high operational reliability and are to ensure consistent high quality of the ceramics.

This and other objects are achieved by a production method of the invention according to the independent claim.

In particular, the disadvantages from the prior art are overcome by virtue of the ceramic part produced comprising a carrier or carrying section which is removed in the further processing of at least one ceramic component.

This has the advantages over the prior art that a large number even of very small components can be produced in a fault-free way in an injection mould. In other words, for example, more than two components can be fabricated monolithically on a common carrier or common baseplate, and the cavity of the mould can be filled axially via the baseplate over an entire projected area of the components. Air is removed from the cavities via the gaps or openings therein. Injection-moulding areas of maximum size permit relatively low pressures and therefore low flow velocities. Accordingly, a method of the invention enables a stable overall system for fabrication of ceramic components.

Furthermore, on a component produced by a method of the invention, the injection-moulding point may be removed or no injection-moulding point may be determinable. Any detrimental microstructure alterations in the region of the injection-moulding point can be avoided. In regions of the component from which the carrier or carrying section has been removed, the component may have a different surface quality from its other areas. In said regions, there are possibly separation traces visible, which may result from the removal of the carrier or carrying section. Moreover, the carrier or carrying section may serve for improving handling. In particular, ejection, gripping and/or tensioning tools are able to engage on the carrier or the carrying section or be supported there without being in direct contact with the ceramic component or its green or brown body, thereby protecting them from damage.

Furthermore, by a method of the invention, structures can be generated in the ceramic component which initially are masked by the carrier or carrier plate and are exposed only after the latter has been removed. Such structures may, for example, be blind holes, which initially are opened only on the component side and end with their bases in the carrier or carrier plate. Following removal of the carrier or carrier plate, the bases are removed and the blind holes have therefore become through holes.

A further possibility is to leave the carrier or carrier plate at least partly standing and to join it, for example, after levelling or other surface machining, in an as it were "back-to-back" format with another carrier or carrier plate. The join may be made both in the green state and in the sintered state. In this way, ceramic components can be produced in sandwich construction.

The solution according to the invention may be supplemented and further improved as desired by the following further embodiments, which are each advantageous in and of themselves:

According to a first further embodiment, the carrier or carrying section holds a multiplicity of ceramic components which are singularized by the removal. This has the advantage that a multiplicity of possibly standardized and/or miniaturized components of identical quality can be efficiently produced essentially in one operation. For this purpose the carrier or carrying section may have, for example, a plate-like form or disc-like form and on one of its flat sides may hold a multiplicity of components which are singularized by the removal of the carrier.

According to a further embodiment, the removal of the carrier or carrying section exposes at least one cavity or recess on the at least one ceramic component. Advantageously, the exposing or opening created thereby to form the cavity or the recess need not be taken into account as early as when the original form of the component is produced. In the design of the original form of the component, aspects other than the opening itself can be considered or emphasized, which otherwise could not be realized or become a focal point of the design. Prior to the removal of the carrier, the cavity or the recess may be present, for example, in the form of a blind hole, which by removal of its base, formed by the carrier or carrying section, is opened and thus becomes a through hole.

According to a further embodiment, the at least one cavity or the at least one recess forms, at least sectionally, a passage opening in the at least one ceramic component. The passage opening may, for example, be a hub or a receptacle for the axle of a cog. Alternatively or additionally, in the region of the passage opening, there may be bezels or undercuts formed which are difficult or impossible to fabricate without carrier or carrying section.

According to a further embodiment, the carrier or carrying section is depleted completely. Between component and carrier there may be a tolerance section provided, which can be depleted to an extent that allows dimensionally accurate production of the component or components to be ensured. By complete removal of the carrier it is possible to compensate manufacturing tolerances. This may be of advantage in particular if the carrier, on one of its flat sides, holds a multiplicity of components, which are singularized by the complete removal.

According to a further embodiment, the sintered ceramic part is cut during the further processing. For cutting, the ceramic part may for example be ground, milled and/or lapped. The depletion of material during the milling, grinding and/or lapping may indeed be relatively small, and the removal of the carrier or carrying section may therefore take several hours. However, the removal may be carried out with great control and precision in this way, without adversely affecting the surface nature of the component or components undesirably, or without damaging the component by breakouts, for example.

According to a further embodiment, the sintered ceramic part, for further processing, is embedded at least sectionally into a holding composition. Embedding allows the ceramic part to be protected by the holding composition, for further processing, and therefore to have better handling qualities than the unprotected ceramic part. In particular, the embedding makes it easier for the ceramic part to be gripped or clamped in, since the holding composition is able, firstly, to fill recesses and cavities in the ceramic part and hence to stabilize it for the enhanced accommodation and distribution of compressive forces. Secondly, the holding composition may surround an outer contour of the ceramic part, at least sectionally, and may therefore offer an increased area for engagement of a gripper and/or clamping jaw, and also, furthermore, may serve to accommodate and/or absorb any vibrations, thereby allowing the ceramic part to be held or clamped as far as possible in a firm manner resistant to displacement.

Furthermore, the holding composition may serve for at least sectional surrounding of components to be singularized and/or to be separated from the carrier or carrying section. This has the effect, on the one hand, in turn of protecting the components, since their outer contours in particular may be surrounded by a protective layer formed by the holding composition. On the other hand, components to be separated or freed from the carrier or carrying section for the purpose of singularization may after removal still be held together by the holding composition, at least temporarily, in the holding composition, thus simplifying the handling of the components.

According to a further embodiment, the ceramic part is pressed into the holding composition. For this purpose, the holding composition may be provided in a form in which it can be demoulded in a highly viscous state in a container and/or on a base. The ceramic part can then be immersed or pressed down from above, to any desired degree, into the holding composition.

According to a further embodiment, after the further processing, the holding composition is dissolved and/or detached from the ceramic part with or in a solvent. The holding composition may be removed from the ceramic component without residue. The holding composition may therefore, merely as a temporarily employed auxiliary, be suitable for re-use, and need not influence the properties of the ultimate ceramic component.

According to a further embodiment, the holding composition is water-soluble and/or alcohol-soluble and after the further processing of the ceramic part or ceramic component, is dissolved in water and/or an alcohol. Water and/or alcohol may advantageously be re-used or disposed of in an environmentally friendly way, and are generally relatively simple and risk-free in their handling.

According to a further embodiment, the holding composition is formed substantially of sugar and/or resin. Sugar and/or resin are generally readily soluble in water or alcohol, respectively, at room temperature. Sugar and resin can be mixed with one another in a ratio that satisfies the particular requirements, and/or may be used in different layers as a holding composition. Resins which can be used are, in particular, natural resins. Alternatively or additionally, coating materials and plastics may be used as a holding composition. From natural sources, for example, lac or shellac obtained from it may be employed.

According to a further embodiment, the holding composition penetrates into at least one free space of the ceramic part, of the carrier and/or of the carrying section, in order to verify or ensure a degree of embedding of the ceramic part, carrier and/or carrying section that is required for further processing. Any free spaces in the form of cutouts and/or openings may allow the ceramic part to be pressed controllably into the holding composition. The holding composition can in that case penetrate into the free spaces.

In the case of a carrier or carrying section in plate or disc form, free spaces may help to bring its flat side properly, as flatly as possible, into contact with the holding composition. For example, one or more ceramic components may be surrounded by the holding composition in their arrangement on a flat side of the carrier, by the pressing of said flat side into the holding composition to an extent that said side is completely or near-completely in contact with the holding composition. In the carrier, free spaces may be formed in the form of window-like through holes, via which it is possible, from the side of the carrier opposite the flat side carrying the components, to check whether the flat side is satisfactorily in contact with the holding composition.

The free spaces themselves may be formed and arranged arbitrarily in accordance with the particular requirements. For example, a multiplicity of free spaces may be arranged symmetrically on the carrier, helping to verify full-area placement or embedding of the flat side. On their side facing away from the flat side, the free spaces may have been provided with a bezel or otherwise designed in such a way as to simplify checking for proper embedding. A bezel is an aid in checking, for example, allowing easy visual determination as to whether holding composition has penetrated from the flat side, with the component or components, through the free space and through to the opposite side of the carrier. The holding composition may at least sectionally overhang, and even overflow, the bezelled region of the free space.

According to a further embodiment, in a forming step, a green body for producing the ceramic part is injection-moulded. As already mentioned at the outset, a method of the invention may be of advantage particularly in the context of injection moulding, since it allows the design of cavities in such a way that they can be filled extremely uniformly by way of the carrier or carrying section. Possible in particular, therefore, is multi-cavity injection moulding of standardized and/or miniaturized green ceramic-component compacts. In injection moulding, the carrier or carrying section may be utilized advantageously to support ejection devices or pins during the demoulding of the injection-moulded green compact.

According to another embodiment, an injection-moulding base of the ceramic component, at least in a transition section to the carrier or carrying section, has an injection-moulding cross-sectional area which is at least as great as a maximum component cross-sectional area of the ceramic component. The cavity of the ceramic component may therefore be filled completely and very uniformly at a high rate and under moderate pressure.

According to a further embodiment, a longitudinal axis of the ceramic component runs substantially parallel to an area normal of the injection-moulding cross-sectional area and/or the component cross-sectional area. The longitudinal axis may be a rotational axis or centre axis of the ceramic component, such as of a cog, for example. The cavity for the green ceramic-component compact can therefore be filled axially, this being an advantage in particular if a multiplicity of green ceramic-component compacts arranged on a carrier or carrying section are to be formed as far as possible simultaneously.

According to a further embodiment, the ceramic component tapers at least sectionally along its longitudinal axis in a direction away from the injection-moulding cross-sectional area and/or the component cross-sectional area. The green ceramic-component compact can therefore be demoulded axially in a very simple and damage-free way. As a result of the tapering, the injection-moulding cross-sectional area can correspond to a maximum component cross-sectional area or at least to a maximum green-compact cross-sectional area of the ceramic component.

According to a further embodiment, after the forming step and before sintering, a secondary shaping step and/or surface machining step is carried out on the green body and/or on a brown body obtained from the green body. Here, the carrier or carrying section may be used advantageously for holding the component or components. An at least sectional covering of the component by the carrier or carrying section may be utilized, for example, in order for the surface of the component to be machined selectively or exclusively in the regions not covered. A multiplicity of components held on the carrier or carrying section may advantageously be subjected together to the secondary shaping step and/or surface machining step.

The object on which the invention is based, and further objects, are likewise achieved by apparatus designed for performing a method of the invention. This is manifested in particular by the fact that in an injection mould according to the invention, or in its cavity, there is a section provided for the forming of the carrier or carrying section, this forming section being in communication with at least one cavity for a ceramic component. An overall cavity of an injection mould according to the invention is shaped in a manner complementary to a ceramic part of the invention, complete with carrier or carrying section and ceramic component. A ceramic component of the invention is joined in particular to at least one carrier or carrying section which is for removal on the further processing of the ceramic component. It is possible here for a multiplicity of ceramic components to be arranged on the carrier or carrying section.

BRIEF DESCRIPTION OF THE DRAWINGS

For better understanding of the present invention, reference is made below to the drawings. These drawings show merely exemplary embodiments of the subject matter of the invention.

IMPLEMENTATION OF THE INVENTION

Figure 1:
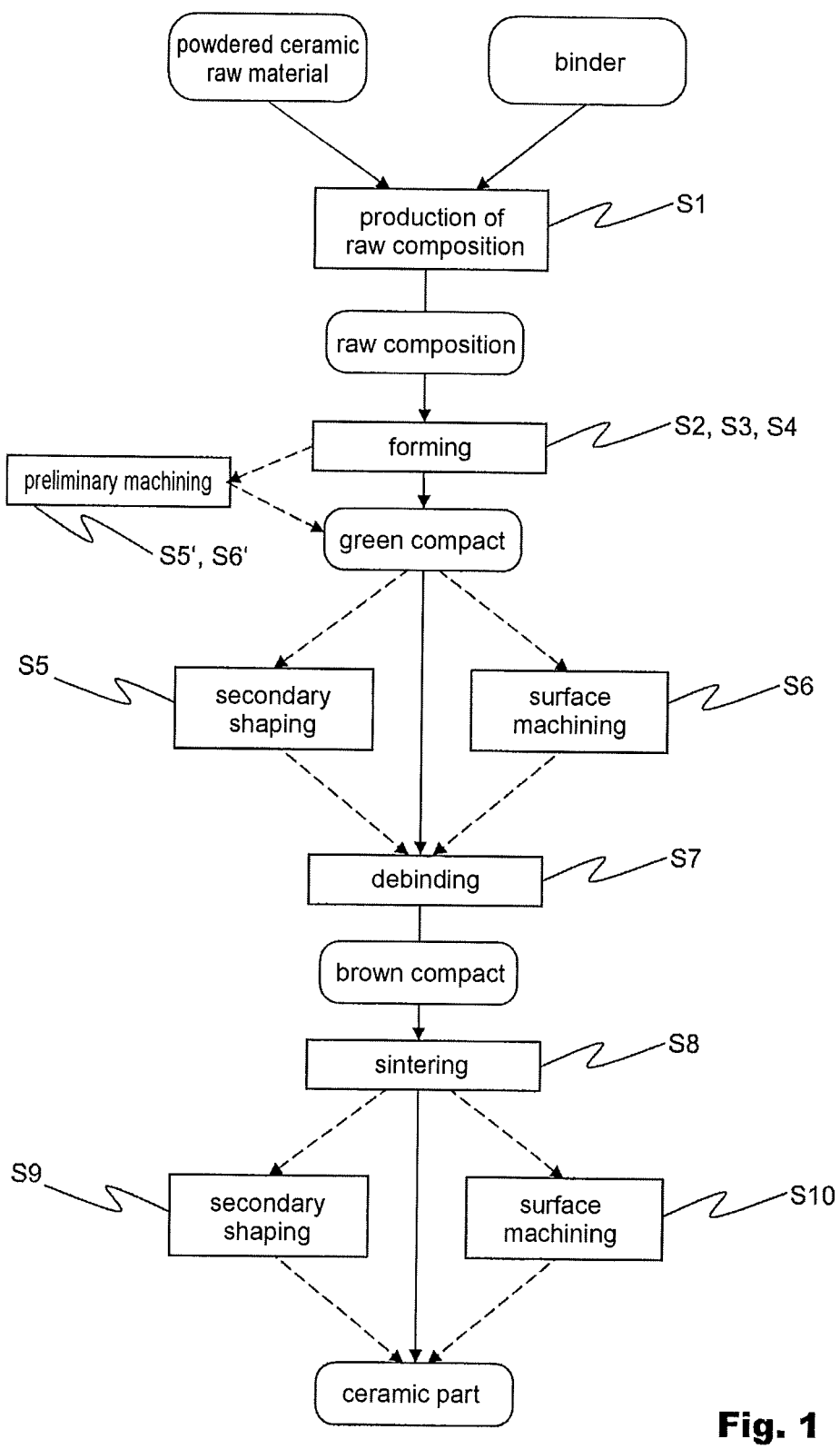
FIG. 1 shows schematically the individual steps of a production method for ceramic parts.

An advantageous production method for technical ceramic parts is shown in FIG. 1. In a first step S1, an injection-mouldable raw composition is produced by mixing a ceramic starting material in powder form with a suitable thermoplastic polymeric binder material.

In a forming step S2, S3 and/or S4, the heated raw composition is brought into the desired form by suitable injection-moulding, 3D-printing or extrusion tooling. After cooling and/or demoulding, the product is referred to as a green compound, the first stage for the subsequent operation of producing the ceramic part. The green compact corresponds in its shape essentially to the future ceramic part, with the dimensions being greater, in order to compensate for the shrinkage during sintering.

In a third step S7, referred to as debinding, suitable methods are used to remove a major part of the binder material matrix from the green compact. The resulting so-called brown compact now consists essentially only of the powdered ceramic starting material, held in shape by a small residual amount of binder material.

Lastly, in a fourth step S8, the brown compact is sintered at high temperatures. The remaining remnants of binder material are pyrolysed in this process. The temperature selected for sintering remains below the melting temperature of the ceramic. The overall thermodynamic system reduces its free enthalpy by local diffusion of ceramic material and by the coalescence of the individual particles at the contact points, thereby lowering the interfacial energy. Cooling results in the fully sintered ceramic part.

S1: Production of the Raw Composition

In an inventive production process for ceramic parts, in a first step S1, an injection-mouldable raw composition is provided. Raw ceramic material used here is pulverulent tetragonal zirconium(IV) oxide or zirconium dioxide ($ZrO_2$, hereinafter simply zirconium oxide). The tetragonal crystal phase is stabilized advantageously by doping with several mol % of yttrium(III) oxide ($Y_2O_3$), for example 3-8 mol %. The addition of 3 mol % of the $Y_2O_3$ leads to a metastable tetragonal phase. Under very high mechanical loading, local stress peaks develop, and can lead to the formation of microcracks. The stress field at the tip of the crack generates the transformation from the tetragonal to the monoclinic phase. As a result of the accompanying increase in volume, the cracks are compacted and crack propagation is slowed. Frequently a small amount of 0.2-0.3% of aluminium oxide is added as well, with the additional effect of a further increase in the mechanical properties. The average particle size is, for example, around 300 nm and in the case of zirconium oxide in particular ought to be between 250 and 350 nm and/or very homogeneous, since otherwise there may be strength problems.

Zirconium oxide has a high hardness in combination with high elasticity and high flexural fracture resistance. This ceramic material is therefore highly suitable, for example, for moving components which are to function precisely and without maintenance under high loads for a long time, examples being cogs in miniaturized transmissions. For medical implants as well, such as dental implants, for example, which are intended to fuse with the bone tissue, zirconium oxide is a highly advantageous material, owing to its very good biocompatibility.

Thermoplastic binder material used is homopolymeric polyoxymethylene (POM-H). Since the acid stabilization customary with POM is not advantageous for the subsequent use, there is no etherification or esterification of the polymer end groups. The melting point of POM-H is around 175-178° C.

The pulverulent zirconium oxide is mixed homogeneously, using suitable equipment, with the thermoplastic binder polymer, to form a granular raw composition which is sold for example under the product name Catamold® by BASF. To produce the raw composition, the constituents are mixed homogeneously in kneading units with exposure to heat, and are subsequently further homogenized. Corresponding technologies are known to the skilled person from the production of raw injection-moulding polymers charged with fillers. The result at the end of the operation is thermoplastic pellets of the kind customarily used as starting material for injection moulding or extrusion, or thermoplastic filaments, of the kind customarily used for 3D printing.

S2: Injection Moulding

The raw pellets are subsequently processed, in a subsequent step S2 as forming step, using suitable thermoplastic injection moulding machines, in which the binder material is melted. The homogeneous raw composition, which is now plastic again, is injected under high pressure (several hundred bar) into corresponding injection moulds, where the composition solidifies in the desired shape. All parts of the injection-moulding unit which come into contact with the injection moulding composition, such as screw, cylinder, die and non-return valve, for example, should be adapted to the abrasiveness of the injection moulding composition, which is relatively high because of the ceramic particles present. For this purpose, for example, these parts may have undergone powder-metallurgical treatment so as to have resistant hard-metal surfaces.

After the demoulding and full cooling of the injection-moulded parts, they can be processed further directly as green compacts in the debinding step S7, or subjected to customary afterwork, for example the removal of the sprue. In analogy to plastics parts, the sprue can be worked up and used once again.

In an alternative variant of the method of the invention, however, it is also possible to subject the green compacts to a further shaping step S5, for example milling, drilling, grinding or turning.

Alternatively or additionally, it is also possible for the surface of the green compact to be machined. An optional workstep S6 of this kind is described later on below.

As a further alternative or additional possibility, it is possible in at least one preliminary machining step S5' and/or S6' to influence the shape and/or surface of a body in the green state actually during, for example at the end or directly after the forming step S2, S3, S4. Thus it is conceivable, in the preliminary machining step S5', S6', to influence the shape of a green body generated in the injection-moulding operation S2 in its injection mould, by combining different green-body sections—by means of "in-mould closing", for example—into a green body prior to ejection from the mould. In a 3D printing step S3, within a preliminary machining step S5' S6', a section can be formed onto a green body, or different green bodies can be joined to one another, having been produced by a different forming method. A green body strand or green body profile obtained by extrusion can be singularized, for example, during the preliminary machining step S5', S6'. Generally, speaking, the surface may be machined or modified as desired during the at least one preliminary machining step S5', S6'.

S7: Debinding

With the method of the invention, debinding is based on a controlled, acid-initiated catalytic breakdown of the binder material POM-H in a temperature range between 90 to 120° C., preferably at 110° C., if the aforementioned Catamold® is used. Zirconium oxide, in contrast, is stable with respect to the majority of acids. In the debinding operation, the polymer chains are depolymerized, starting from the ends, and are broken down into gaseous formaldehyde. The acid, which advantageously is likewise in gaseous form, acts from the surface of the green compact and diffuses through the open porous structure, gradually formed by the breakdown of the binder polymer matrix, into the interior. The gaseous formaldehyde monomers which form during the acid-initiated catalytic breakdown in turn diffuse outwards through the porous structure.

The debinding operation therefore takes place continuously from the outside inwards at a rate which is dependent on the amount of acid added and is from about 0.1 to 0.8 mm/h, more particularly from 0.4 to 0.6 mm/h. Increasing the amount of acid does have the effect of accelerating the debinding operation, but may cause it to become non-uniform, which in turn may be problematic.

Depending on the dimensioning of the parts to be debindered, debinding is carried out until the binder matrix, throughout the volume of the workpiece, has broken down to such an extent that only a small remnant remains (for example 0.3-0.5 wt % of the original binder matrix). The result is the brown compact, consisting essentially only of zirconium oxide particles. The remaining small remnant of the binder matrix, of around 0.3-0.5% is used for mechanical stabilization of the brown compact. The remaining binder matrix undergoes complete pyrolysis in the subsequent sintering step S8 at just a few hundred ° C. during the heating of the brown compact to sintering temperature.

In the case of inventive methods, debinding takes place at elevated temperature and atmospheric pressure, using nitric acid as the acid to initiate the debinding operation. The green compacts are transferred to a suitable oven and are heated to the intended temperature. With an inventive method, this temperature is in a range from 90 to 110° C. and with particular advantage is 110° C.

When the operating temperature has been reached, a certain amount of nitric acid is added to the oven, and at these temperatures undergoes transition to the vapour state. The residence time is dependent on the geometry of the workpieces.

Gas emerging from the oven is advantageously supplied for cleaning, in order to capture nitric acid and formaldehyde. Corresponding technologies are known to the skilled person, involving, for example, burning off to form $CO_2$ and $H_2O$, or condensation and gas scrubbing.

After debinding, the brown compacts are cooled and stored to await the subsequent sintering.

S8: Sintering

On sintering, the individual particle surfaces of the ceramic material are fused with one another. In a first stage, the individual particles undergo rearrangement, with diffusion of material increasing the area of contact, thus lowering the interfacial energy. In a second stage, the individual particles continue to coalesce, forming what are called necks. Grain boundaries develop. In the third stage, the grains grow, and the pore channel system is reduced. During sintering, the workpiece contracts and the density goes up.

The sintering of zirconium oxide takes place in a suitable sintering oven, at temperatures well below the phase transition temperature from the tetragonal crystal phase into the cubic crystal phase (2370° C. for pure zirconium oxide), and hence of course also below the melting temperature (2690° C.). With an inventive method, the sintering temperature is in a range from 1350 to 1550° C., and advantageously in a range from 1400 to 1480° C., more particularly at 1450° C. For an extremely fine microstructure to the ceramic material, fairly low sintering temperatures, within the lower range of the temperature span specified, are selected. Sintering temperatures in the upper region of the temperature span, in contrast, increase the density and grain size of the ceramic material, causing its elasticity and strength to decrease.

The entire sintering process lasts about 24 to 36 hours for zirconium oxide, depending on selected temperature and component size. After sintering, the ceramic parts are slowly cooled. At this point they are in their original form, are mechanically solid, and have a closed surface. As a result of the sintering operation, the parts, by comparison with the green compact, undergo shrinkage of around 22% on a linear basis, with a tolerance range of ±0.3%. The shrinkage arises from the contraction of cavities present in the brown compact after the binder has been dissolved out.

In one particularly advantageous variant of an inventive method, the debinding step and the sintering step are carried out in the same oven, without any need for the brown compact to be cooled, stored and reheated in between. As well as the resultant energy saving and reduction in the work effort, a procedure of this kind has the advantage of avoiding mechanical loads on the workpiece during cooling and heating, and means that the brown compacts, which are very sensitive, cannot be damaged by improper treatment.

Another advantage is that such an oven can be constructed so that it is able to carry out automatically all of the steps from the green compact through to the fully sintered ceramic part. An oven of this kind with a comparatively small loading volume can be used, for example, in a workshop for the production of implants.

In an alternative variant of the inventive method, however, it is also possible for the ceramic parts, after the sintering step S8, to be subjected to an additional shaping step S9, for example milling, drilling, grinding or turning.

Alternatively or additionally, it is also possible for the surface of the ceramic parts to be machined. An optional workstep S10 of this kind is described later on below.

S3: 3D Printing as Shaping Method

In a further advantageous variant of an inventive method, a three-dimensional printing method (3D printing) S3 is used as the fundamental shaping step for producing the green compact, rather than the injection-moulding method S2.

In the application by the applicant with the title "Freeform ceramic components", which was filed on the same date as the present application and whose disclosure content is hereby included in its entirety, by reference, in the present description, an advantageous method of this kind for producing green compacts is disclosed.

Using a suitable 3D printer system, the green compacts are built up additively from the raw thermoplastic composition. As well as the pulverulent yttrium-stablized zirconium oxide, the raw composition advantageously consists again of POM-H as thermoplastic binder polymer. The thermoplastic raw material can be applied with a suitable printing head, in the form of a nozzle, for example, in dot or stripe formation, in liquid or plastic form, to the green compact under construction (Fused Deposition Modelling). In order to construct the required support structures in the case of shapes with overhangs, a second material can be used, as for example a polymer readily soluble in solvents, which can be dissolved after the 3D printing of the green compact, leaving only the material of the green compact. Alternatively, binder material without zirconium oxide can also be used, and is removed or broken down without residue during the debinding of the green compact.

The raw material may alternatively be provided in the form of a fine, free-flowing powder and may be melted on layer by layer by means of laser light (selective laser melting) or sintered (selected laser sintering), with the term "sintering" in this case referring to the thermoplastic particles, and not, for instance, to the subsequent sintering of the multiplicity of ceramic particles within the thermoplastic particles. In order to lower the melting temperature, the chain length of the POM-H polymer may be shorter than in the case of a raw composition for an injection-moulding process.

The advantage of 3D printing in the preparation of green compacts lies with the fabrication of individual parts or short runs. In particular it is possible in this way, on the basis of specific 3D data, to prepare relatively large ceramic implants, for reconstructive facial surgery, for example.

The green compacts prepared in this way can be further-processed directly to the completed ceramic part by means of steps S7 (debinding) and S8 (sintering). Alternatively, before the debinding, there may be a secondary shaping step S5, and/or a surface treatment S6.

S4: Extrusion as Shaping Process

In a further advantageous variant of an inventive method, the forming step used for producing the green compact, rather than the injection-moulding process S2 or the three-dimensional printing process S3, is an extrusion process S4. The corresponding production operation is illustrated schematically in FIG. 3.

An advantage of extrusion in the preparation of green compacts lies in the application of short runs with piece counts too small, on the one hand, for it to be worth while producing an injection mould, and too large, on the other, for the economic application of a 3D printing process. By extrusion, in particular, it is possible to prepare small, uniform components, such as cogs or axles, for example.

S5: Secondary Shaping of the Green Compact

The shape of the green compact may be manipulated in accordance with the specific requirements, at least sectionally, during and/or after demoulding or shaping, in at least one secondary shaping step S5.

Such manipulation may be necessary in particular if the green compact exhibits distortion on cooling as a result of contraction processes. This may be the case, for example, if the green compact comprises a multiplicity of components arranged on a carrier or carrier plate. If the components are arranged along one longitudinal side of the carrier or on one flat side of the carrier plate, it may be necessary to compensate distortion of the carrier or carrier plate.

The compensation may be performed by cutting, for example by flat grinding of the components. In order to achieve the compensation, sections of the components and/or of the carrier may be removed. Depending on requirements, the cutting must be carried out very precisely, for example in ranges of 2 to 10 μm maximum material depletion, especially in the case of relatively small components.

The manipulation may be necessary, moreover, if the green compact has been shaped by extrusion. In the case of extrusion, in general, a green body strand or green body profile is shaped, comprising a multiplicity of green-state components that are still to be singularized. Singularization may take place, for example, by regular separation of extruded green bodies from the strand or profile.

Since extrusion can generally only be used to shape strands and profiles with constant cross section, any cross-sectional alterations that are desired on extruded green bodies must be made retrospectively. In particular, any kind of indentations, such as notches or grooves, for example, can be made along the external periphery of the green compact.

One way in which the indentations may be formed is by cutting. Another possible way is for the indentations to be generated, owing to the thermoplastic properties of the green compact, using shaping tools which penetrate the surface of the green compact. The surface may be pressed in, for example, while the green compact has not yet fully cooled, after extrusion, or pressing-in takes place on the cooled green body by means of a heated tool, such as a die, for example.

It would in fact be possible, as a further alternative, for secondary shaping to take place on the brown compact. In comparison to the green compact or sintered ceramic part, however, the brown compact is relatively brittle and fragile. As already mentioned, indeed, the brown contact is held together potentially only by the residual binder, and has a comparatively open-pored structure. This is a hindrance to machining of the brown compact.

In order to remedy this situation, the brown compact may be dipped at least superficially into a filling material, such as a liquid thermoplastic polymer, for example. The solidified polymer would at least on a surface basis fill the pores of the brown compact and therefore stabilize the compact, hence simplifying its secondary shaping, by clamping and also cutting, for example. After the secondary shaping, the filling material can be pyrolysed in a further debinding step and/or during sintering. Filling of the pores, however, entails a certain time burden, which may have adverse consequences for the production process or production rate.

S6: Surface Machining of the Green Compact

Advantageously, the increase in surface roughness is performed on the green compact itself, since the compact is easier to machine. In one advantageous variant, the surface of the green compact is sandblasted. Because the green compact is much less hard than the sintered ceramic part, this operation is much shorter than if practised on the sintered ceramic part.

In another advantageous variant, the surface of the green compact is subjected to a multiplicity of narrowly focused laser pulses, in order to carry out local melting or, preferably, evaporation of the surface and so to achieve the desired roughness.

In a further embodiment, fine ceramic particles of the same kind as in the raw composition, i.e. zirconium oxide particles, for example, are coated by suitable methods with a very thin layer of binder material. The green compact can then be coated with these particles. For example, the green compacts can be heated at the surface briefly, using hot air or infra-red, and the thermoplastic matrix melted, to an extent such that the binder-coated particles remain sticking to the surface when the heated green compact is conveyed into a chamber containing fluidized particle dust, or is immersed completely, or at least sectionally, in a targeted way, into a bath of corresponding particle dust. A ceramic part coated in this way can then be processed further with the afore-described debinding methods and sintering methods. On sintering, the adhering ceramic particles join with the ceramic body, leading to an increased surface roughness.

Alternatively or additionally, the surface of the green compact may at least sectionally be smoothed. In this way it is possible, for example, to eliminate unevennesses on the surface of the green compact, which may arise from the respective shaping process. Such unevennesses may come about in particular in the course of the 3D printing process in the transitions between the individual printed layers. In order to eliminate the unevennesses, for example, a stream of gaseous substance may be directed onto the surface of the (still thermoplastic) green compact. The surface of the green compact can also be ground.

As a further alternative or additional possibility, additives may be introduced into the green compact or a brown compact produced therefrom, these additives possibly comprising transport substances and also additional materials accommodated therein. Particularly advantageous afterworking processes of this kind are disclosed in the applicant's application with the title "Method and apparatus for producing ceramic parts", which was filed on the same date as the present application and whose disclosure content is hereby incorporated in its entirety, by reference, into the present description.

S9: Secondary Shaping of the Ceramic Part

The ceramic parts produced by the inventive method identified above can be subsequently further afterworked, for example by means of various grinding and polishing methods, cutting methods, sandblasting, laser machining and glazing. Likewise possible are afterworking methods which further improve the structural properties of the ceramic, examples being hot pressing or hot isostatic pressing. In the case of hot isostatic pressing, known as HiPing, ceramic parts are densified at a pressure of 2000 to 3000 bar and approximately sintering temperature on the surface. This allows the fracture resistance of the ceramic part to be increased by up to 25%, to around 1300 mPa.

In an inventive method, which is described in detail later on below, with reference to FIGS. 2 to 12, on the basis of corresponding exemplary embodiments, the ceramic part in a first step is at least sectionally poured or dipped or pressed into a holding composition. In a second step, part of the ceramic part is cut. The holding composition here allows the machining even of very finely structured ceramic parts. The holding composition protects the ceramic part from mechanical damage and allows it to be clamped easily into holding apparatus of the cutting machine. In a third step, the holding composition is removed again, by being dissolved, for example.

Used advantageously as a holding composition is a soluble polymer, for example a resin, a sugar and/or the oxidized and condensed reaction products thereof. The ceramic part to be machined is, for example, poured into the molten holding composition or pressed into a layer of holding composition. The resulting block or assembly is clamped into a mount for the cutting procedure. After the milling procedure, the holding composition or polymer matrix thereof is dissolved using suitable solvents, for example with water and/or alcohol or ethanol, an acetone/water mixture, an aqueous solution of borax or ammonia solution, etc.

Used advantageously as holding composition is a natural material which is biodegradable and physiologically unobjectionable. Besides the aforementioned sugar, a natural resin used may be, for example, purified lac. This lac can be dissolved by likewise unproblematic solvents such as ethanol or borax solution, and can be used a number of times. Alternatively, it is also possible to use purified lac pre-alkalified with borax, such lac being directly water-soluble.

In a first method variant, a common extended sprue piece in the form of a carrier or carrier plate, with a plurality of—for example—identical small parts, is removed by cutting, as for example by grinding, to result ultimately in the singularized small ceramic parts, examples being ceramic cogs with diameters of a few millimetres. The extended sprue piece, which may have, for example, the form of a plate, makes it possible on the one hand, during injection moulding, for there to be homogeneous flow of material over the entire volume of the subsequent small ceramic part, and, as a result, correspondingly homogeneous physical properties. On the other hand, mechanical damage to the green compact during demoulding is avoided. Likewise, handling during the subsequent production steps is greatly simplified.

In another method variant, a part of a substantially plate-shaped ceramic part is cut over its area. On one side of the plate, the ceramic plate has recesses or indentations, such as blind holes or slots, for example, which are cut into when material is milled away over the area on the other side of the plate. The result is a ceramic part having continuous holes or slots, which could not be fabricated directly by corresponding injection moulding of the green compact, and which could otherwise be produced only, in a very costly and inconvenient manner, by subsequent machining of the ceramic plate by drilling or slot milling.

S10: Surface Machining of the Ceramic Part

The surface of the sintered ceramic part is a product essentially of the properties of the surface of the green or brown compact. Surfaces produced by injection moulding are comparatively smooth. For certain applications, however, it may be advantageous to increase the surface roughness of the ceramic part, as in the case of implants, for example, in order to facilitate the stable coalescence with bone tissue. For this purpose, customarily, the surface of the sintered ceramic part is roughened by sandblasting and/or etching. Etching can be carried out using hydrofluoric acid, for example.

Alternatively or additionally, the surface of the ceramic part may be smoothed.

Ceramic Parts of the Invention

Figure 2:
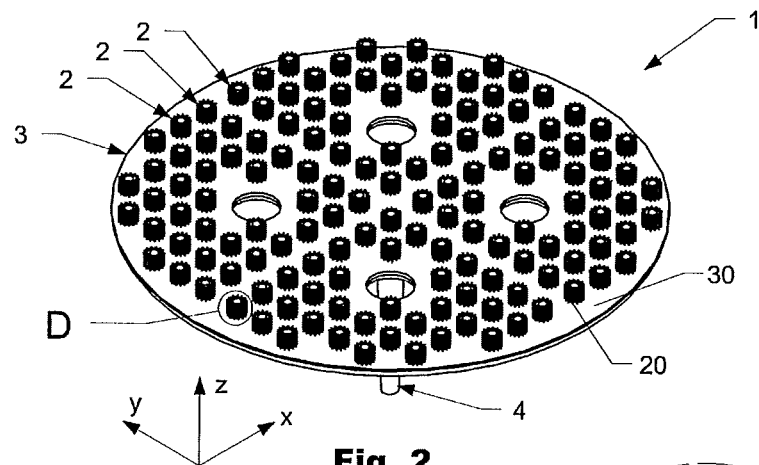
FIG. 2 shows a first exemplary embodiment of an inventive ceramic part with ceramic components and carrier or carrying section in a schematic perspective view.

FIG. 2 shows an inventive ceramic part 1 in a schematic perspective view. The ceramic part 1 extends along a longitudinal direction X, a transverse direction Y and a vertical direction Z, which together define a Cartesian coordinate system. In its form as depicted in FIG. 1, the ceramic part 1 may be present in the green state, the brown state or the sintered state prior to further processing.

The ceramic part 1 comprises a multiplicity of ceramic components 2, which are arranged on a carrier or carrying section 3 and are therefore joined to it. Furthermore, the ceramic part comprises a sprue 4, which is joined to the carrier 3. The ceramic components 2 have an end face 20, which is dished toward a flat side 30 of the carrier 3 and which, in a cross-sectional plane defined by the longitudinal direction X and transverse direction Y, corresponds to an injection-moulding cross-sectional area of the ceramic components 2, which in the present case at the same time represents their component cross-sectional area.

Figure 3:
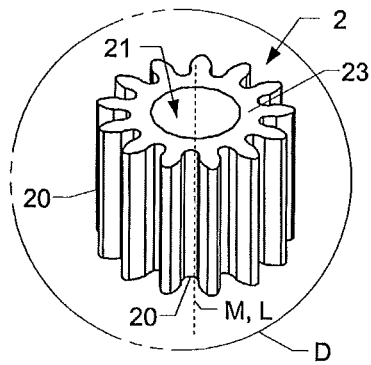
FIG. 3 shows a detail D from FIG. 2.

FIG. 3 shows a detail D in FIG. 2. Here it is clear that the ceramic components 2 are, for example, cogs. They have a centre axis M, which runs essentially parallel to an area normal of the injection-moulding cross-sectional area and hence at the same time of the flat side 30, and which also forms a longitudinal axis L of the ceramic component 2. The centre axis runs concentrically to a recess or a hollow space 21, which before the removal of the carrier represents a blind-hole bore and from which, after the removal of the carrier 3, in the present exemplary embodiment, a through bore is formed for accommodating a bearing axle of the ceramic component designed as a cog. Further, the ceramic component 2 possesses an outer periphery 22, along which in the present exemplary embodiment teeth of the cog are arranged. A top face 23 of the ceramic component faces away from the flat side 30 of the carrier 3.

Figure 4:
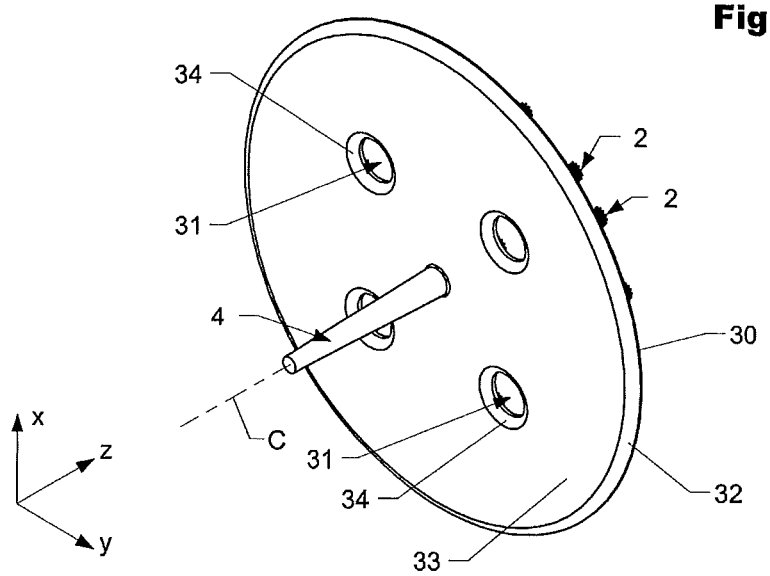
FIG. 4 shows the ceramic part illustrated in FIGS. 2 and 3 in another schematic perspective view.

FIG. 4 shows the ceramic part 1 in a further schematic perspective view. Here it is clear in particular that the carrier 30 has a plurality of free spaces or passages 31, and a substantially circular outer periphery 32. The free spaces 31 extend from the flat side 30 to an underside 33 of the carrier 3 against the vertical direction Z. Towards the underside 33, the free spaces 31 are provided with a bezel 34. The free spaces 31 are positioned essentially at equal intervals from one another along a circular track K, which is arranged concentrically to a central axis C of the ceramic part 1. The central axis C in turn forms a centre axis of the sprue 4 extending perpendicularly away from the underside 33. At the same time, the outer periphery 30 is arranged concentrically around the central axis C. This quasi-rotationally symmetrical design of the ceramic part 1, around the central axis C, facilitates uniform filling of a cavity for producing it by injection moulding.

Figure 5:
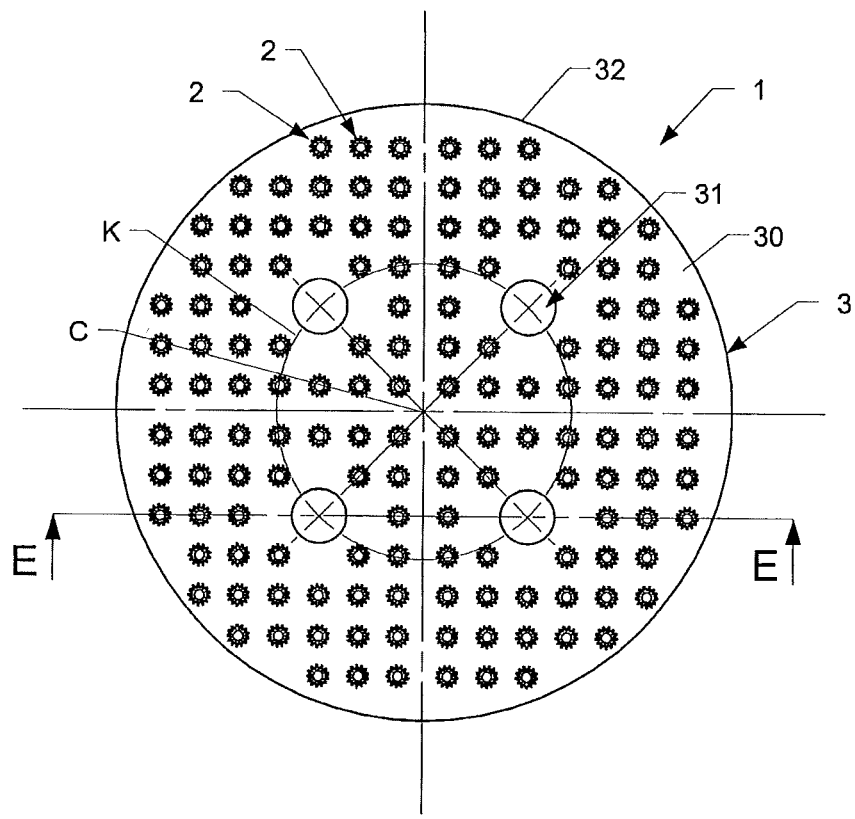
FIG. 5 shows the ceramic part illustrated in FIGS. 2 to 4 in a schematic front view.

FIG. 5 shows the ceramic part 1 in a schematic front view. Here it is clear how the ceramic components 2 are arranged in a grid format on the flat side 30 of the carrier 3. In the present exemplary embodiment, there are 144 ceramic components 2. Also clear is the arrangement of the free spaces 31 on a circular track K which runs concentrically around the central axis C.

Figure 6:
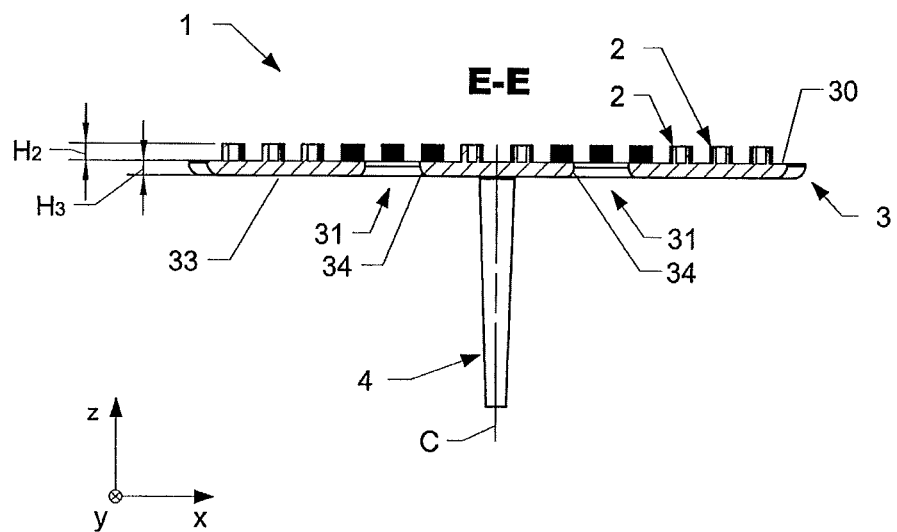
FIG. 6 shows a schematic cross-sectional view of the ceramic part illustrated in FIGS. 2 to 5, along a line of section E-E as drawn in FIG. 5.

FIG. 6 shows a schematic cross-sectional view of the ceramic part 1 along a line of section E-E as drawn in FIG. 5. Here it is particularly clear how the ceramic components 2 extend in the vertical direction Z essentially perpendicularly away from the flat side 30 of the carrier 3, with their centre axes M running essentially parallel to the central axis C. It is also clear that the flat side 30 of the carrier forms a base of the recesses 21 of the ceramic components 2. Prior to further processing of the ceramic part 1, therefore, the recesses, bounded accordingly by the carrier 3, take the form of blind holes.

For the further processing of the ceramic part 1, the carrier 3 can be removed in accordance with the invention from the ceramic components 2. For this purpose, for example, the ceramic components 2 can first be pressed in the vertical direction Z into a holding composition, until this composition completely surrounds the ceramic components 2. This is generally the case when the entire flat side 30 of the carrier 3 is in contact with the holding composition, which has therefore ideally penetrated even the recesses 21 of the ceramic components 2 and ought to have filled them completely. By virtue of the free spaces 31, it is possible to verify whether the ceramic part 1 is properly embedded into the holding composition, by its projecting from the free spaces 30 toward the underside 33, for example, against the vertical direction Z. The bezels 34 may simplify verification of the proper embedding, with the holding composition, in the properly embedded state of the ceramic part 1, swelling out of the free spaces to such an extent that it goes over the bezels 34 in each case.

The carrier 3 can then be removed. Removal may be accomplished, for example, by cutting the carrier, embedded in the holding composition, out from its underside 33. After cutting has taken place, the carrier 3 is removed over its entire height $H_3$, leaving the ceramic components 2 surrounded by the holding composition. The ceramic components 2 can be singularized by removal of the holding composition. Advantageously, a height $H_2$ of the ceramic components 2 connected to the carrier 3 exceeds its desired final height, producing a tolerance range which can be utilized, for example, in order to compensate any distortions in the carrier 3 that may be brought about by the sintering of the ceramic part 1.

Figure 7:
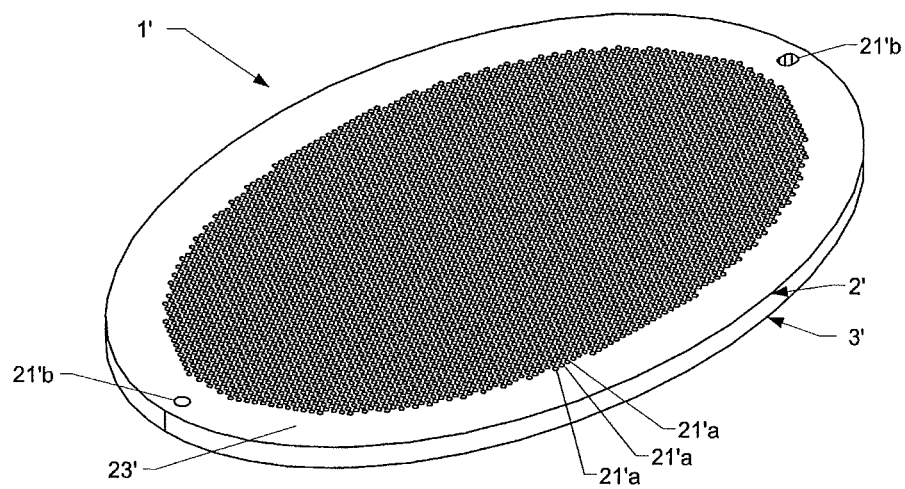
FIG. 7 shows a further exemplary embodiment of an inventive ceramic part with a ceramic component and carrier or carrying section in a schematic perspective view.

FIG. 7 shows a further exemplary embodiment of an inventive ceramic part 1', having a ceramic component 2' and a carrier or carrying section 3, in a schematic perspective view. In contrast to the ceramic part 1, the carrying section 3 is merely joined to the single lattice-like ceramic component 2', which may be, for example, an electrode or a lattice of a loudspeaker. In the case of the exemplary embodiment shown in FIG. 7, an end face or injection-moulding cross-sectional area 20' of the ceramic component 2 is covered by the entire carrying section 3' in a projection along the vertical direction Z (see FIG. 9).

The ceramic component 2' possesses recesses or hollow spaces 21'*a* which extend, against the vertical direction Z, away from one top face 23' of the ceramic component 2' towards its end face 20, which in FIG. 7 is hidden by the carrier 3. Accordingly, the recesses 21'*a*, similarly to the situation with ceramic part 1, are blind holes prior to further processing. Further recesses or hollow spaces 21'*b* in the ceramic part 1 are likewise initially in the form of blind holes in the case of the exemplary embodiment shown in FIG. 7.

Figure 8:
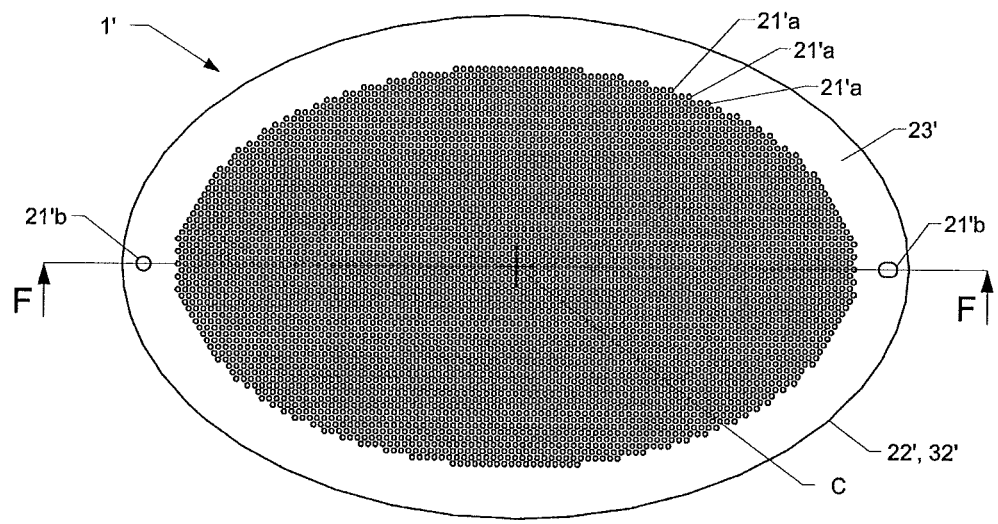
FIG. 8 shows the ceramic part illustrated in FIG. 7 in a schematic front view.

FIG. 8 shows the ceramic part 1' in a schematic front view. Here it is clear that the ceramic part 1' has an essentially oval outer periphery, which forms both an outer periphery 22' of the ceramic component 2 and also an outer periphery 32 of the carrying section 3 and is arranged concentrically around the central axis C of the ceramic part 1'.

Figure 9:
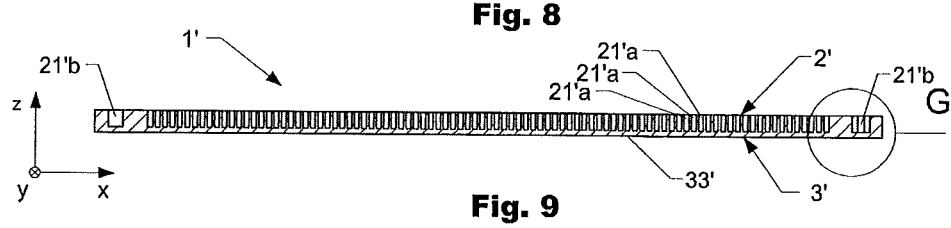
FIG. 9 shows a schematic cross-sectional view of the ceramic part illustrated in FIGS. 7 and 8, along a line of section F-F as drawn in FIG. 5.
Figure 10:
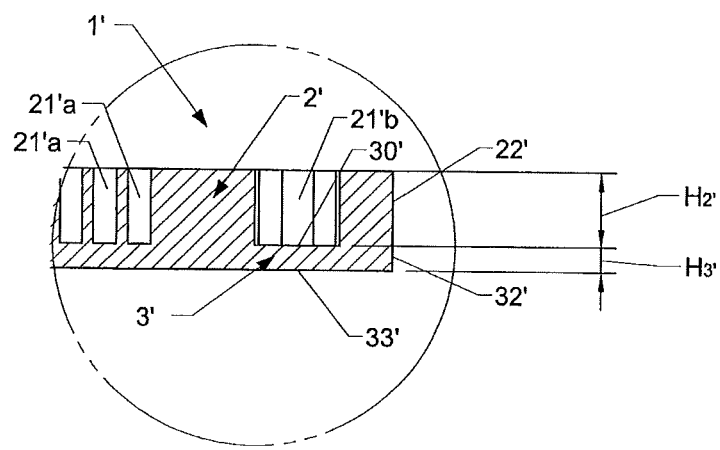
FIG. 10 shows a detail G from FIG. 9.

FIG. 9 shows a schematic cross-sectional view of the ceramic part 1 along a line of section F-F, which is drawn in FIG. 8. FIG. 10 shows a detail G from FIG. 9. From FIGS. 9 and 10 it is clear that an underside 33 of the carrier section 3' may be completely closed before the further processing. Accordingly, all the recesses or hollow spaces 21'*a*, 21'*b* may be present in the form of blind holes, with each of their bases formed by a flat side 30 of the carrier 3.

In the case of the ceramic part 1', similarly to the situation with the ceramic part 1, the carrying section 3' may be removed from the ceramic component 2', and the free spaces 31' may therefore be opened. For this purpose, for example, the ceramic component 2', together with the carrying section 3', can be dipped or embedded in vertical direction Z into a holding composition, so that, optimally, the recesses or hollow spaces 21'*a*, 21'*b* are filled with holding composition and, possibly, the outer peripheries 22', 32' as well are surrounded by holding composition. For further processing, the carrying section 3' may likewise be removed from the ceramic component 2' by cutting.

Figure 11:
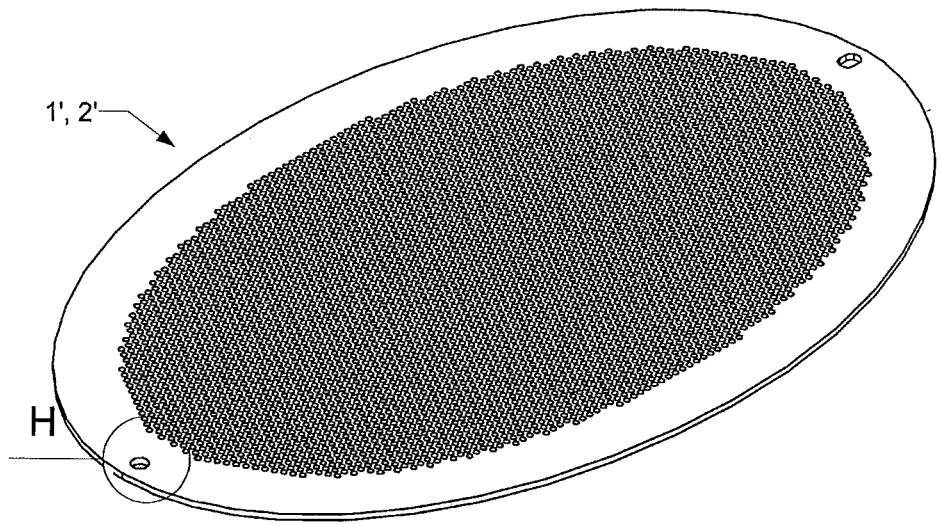
FIG. 11 shows the ceramic part illustrated in FIGS. 7 to 10, after the removal of the carrier or carrying section, in a schematic perspective view.
Figure 12:
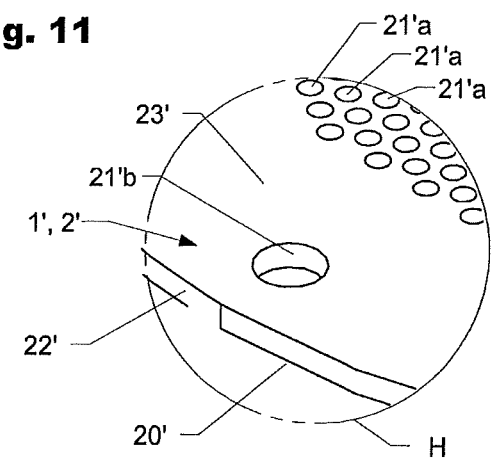
FIG. 12 shows a detail H from FIG. 11.

FIG. 11 shows the ceramic part 1' after the removal of the carrying section 3' and therefore solely the ceramic component 2', in a schematic perspective view. FIG. 12 shows a detail H from FIG. 11. Here it is made clear that by removal of the carrying section 3', the recesses or hollow spaces 21'*a*, 21'*b* are opened and through holes are produced from them.

Deviations from the exemplary embodiments described above are possible within the framework of the invention concept. For instance, the ceramic parts 1, 1', ceramic components 2, 2', carriers or carrying sections 3, 3' and also sprues 4 may have a design and number corresponding to the particular requirements.

Ceramic components 2, 2' may feature end faces 20, 20' in any desired form and number which, in accordance with the respective requirements, form injection-moulding cross-sectional area, and may have been provided with recesses or hollow spaces 21, 21'*a*, 21'*b*, which may have been provided in any desired number per ceramic component 2, 2' and/or per carrier or carrying section 3, 3'. The outer peripheries 22, 22' and/or top faces 23, 23' of the ceramic components 2, 2' may be designed in accordance with the particular requirements.

Carriers or carrying sections 3, 3' may be provided with any desired number of flat sides 30, 30', free spaces or passages 31, 31', outer peripheries 32, 32', undersides 33, 33' and/or bezels 34, all designed in accordance with the particular requirements. For maximum uniformity in the filling of the cavity, the carriers or carrying sections 3, 3' are advantageously circular in design and, in the case of the present exemplary embodiments, have diameters of around 80 mm, though may also be sized and shaped differently in accordance with the particular requirements.

The method of the invention is not confined to the production of the technical ceramic components described here, but instead may be used for producing any desired components of ceramic, especially if they are to be produced in a certain piece number or in standardized form. Suitable standardized components include, for example, parts of medical implants, such as dental implants, which at present are produced in a conventional dual-chamber injection-moulding process.

LIST OF REFERENCE SYMBOLS

1, 1' ceramic part
2, 2' ceramic component
3, 3' carrier/carrying section
4 sprue
20, 20' end face/injection-moulding cross-sectional area
21, 21'*a,b* recess/hollow space
22, 22' outer periphery
23, 23' top face
30, 30' flat side
31 free spaces/passages
32, 32' outer periphery
34 bezel
C central axis
H height
K circular track
L longitudinal axis
M centre axis
X longitudinal direction
Y transverse direction

The invention claimed is:

1. Method for producing a plurality of ceramic components each component having recesses and/or hollow spaces, the method comprising:
providing at least one sintered ceramic part comprises a carrier or carrying section with a flat side, and wherein a plurality of ceramic components protrudes from said flat side of the carrier or carrier section; and in a further process:

removing the carrier or carrying section from the plurality of ceramic components, wherein the removal of the carrier or carrying section exposes at least one hollow space or recess on the plurality of ceramic components, wherein removing the carrier or carrying section from the plurality of ceramic components comprises:

embedding the plurality of ceramic components protruding from said flat side of the carrier or carrier section in a holding composition, such that the holding composition completely surrounds at least one ceramic component of the plurality of ceramic components and the entire flat side of the carrier or carrying section is in contact with the holding composition;

cutting away the carrier or carrying section from the underside of the carrier or carrying section, opposite to the flat side of the carrier or carrying section, toward the flat side, until only the at least one ceramic component surrounded by the holding composition is left; and singularizing the at least one ceramic component by removal of the holding composition.

2. Method according to claim 1, wherein the at least one hollow space or the at least one recess at least sectionally forms a passage opening in the plurality of ceramic components.

3. Method according to claim 1, wherein the carrier or carrying section is depleted completely.

4. Method according to claim 1, wherein the ceramic part is pressed into the holding composition.

5. Method according to claim 4, wherein after the further process, the method comprises:

dissolving the holding composition in a solvent; and detaching the holding composition from the ceramic part.

6. Method according to claim 5 wherein the holding composition is water-soluble and/or alcohol-soluble, and the dissolving occurs in water and/or an alcohol.

7. Method according to claim 4, wherein the holding composition is formed substantially of sugar and/or resin.

8. Method according to claim 4, wherein the holding composition penetrates into at least one free space of the ceramic part, of the carrier and/or of the carrying section in order to verify and/or ensure a degree of embedding of the ceramic part, of the carrier and/or of the carrying section that is selected for the further process.

9. Method according to claim 1, wherein a green body for producing the ceramic part is injection-moulded in a forming step.

10. Method according to claim 9, wherein an injection-moulding base of the ceramic component of the ceramic part, at least in a transitional section to the carrier or carrying section, has an injection-moulding cross-sectional area which is at least as great as a maximum component cross-sectional area of the ceramic component.

11. Method according to claim 10, wherein a longitudinal axis of the plurality of ceramic components extends substantially parallel to an area normal of the injection-moulding cross-sectional area and/or of the component cross-sectional area.

12. Method according to claim 11, wherein the plurality of ceramic components tapers at least sectionally along its longitudinal axis in a direction away from the injection-moulding cross-sectional area and/or the component cross-sectional area.

13. Method according to claim 9, wherein after the forming step and before sintering, a secondary shaping step and/or surface machining step is carried out on the green body and/or on a brown body obtained from the green body.

14. Method according to claim 1, comprising: producing the ceramic part by 3D printing.

15. Method according to claim 1, comprising: producing the ceramic part by extrusion molding.

* * * * *